United States Patent [19]

Kanoh

[11] Patent Number: 5,040,136
[45] Date of Patent: Aug. 13, 1991

[54] ARITHMETIC CIRCUIT FOR CALCULATING AND ACCUMULATING ABSOLUTE VALUES OF THE DIFFERENCE BETWEEN TWO NUMERICAL VALUES

[75] Inventor: Toshiyuki Kanoh, Tokyo, Japan
[73] Assignee: NEC Corporation, Tokyo, Japan
[21] Appl. No.: 601,628
[22] Filed: Oct. 23, 1990

[30] Foreign Application Priority Data

Oct. 23, 1989 [JP] Japan .................................. 64-276872

[51] Int. Cl.$^5$ ............................................... G06F 7/38
[52] U.S. Cl. ................................................. 364/715.01
[58] Field of Search ...................... 364/715.01, 715.08, 364/768, 736, 769, 748, 784–788

[56] References Cited

U.S. PATENT DOCUMENTS

| | | | |
|---|---|---|---|
| 4,761,759 | 8/1988 | Nakagawa | 364/769 |
| 4,807,172 | 2/1989 | Nukiyama | 364/715.08 |
| 4,849,921 | 7/1989 | Yasumoto et al. | 364/715.01 |
| 4,908,788 | 3/1990 | Fujiyama | 364/748 |
| 4,953,115 | 8/1990 | Kanoh | 364/715.01 |

FOREIGN PATENT DOCUMENTS 0328063  8/1989  European Pat. Off. .

*Primary Examiner*—Gary V. Harkcom
*Assistant Examiner*—Tan V. Mai

*Attorney, Agent, or Firm*—Sughrue, Mion, Zinn Macpeak & Seas

[57] ABSTRACT

An arithmetic circuit for calculating and accumulating absolute values of differences between first and second numerical values having a predetermined bit length and represented by 2's compliment notation is provided by a first inverter for inverting the second numerical value to produce an inverted value; a first adder receiving the first numerical value and the inverted numerical value and generating a sum as a first addition result; and a selector receiving the first addition result from first adder and an inverted addition result from the first adder via a second inverter and outputting a selected value based on the sign of the first addition result. A correcting value generating circuit generates a correcting value based on the sign of the first addition result. A second adder receives the selected value, the correcting value and a delayed addition result and generates a sum as a second addition result, which is output to a first delay circuit. The first delay circuit delays the second addition result by a predetermined delay and outputs the delayed addition result as an operation result while providing the delayed addition result to the second adder. Additional delay circuits responsive to a clock signal can be operatively coupled between the selector and the second adder to match the speeds of the selector and the first delay circuit.

5 Claims, 3 Drawing Sheets

ARITHMETIC CIRCUIT FOR CALCULATING AND ACCUMULATING ABSOLUTE VALUES OF THE DIFFERENCE BETWEEN TWO NUMERICAL VALUES

BACKGROUND OF THE INVENTION

The present invention relates to an arithmetic circuit and, more particularly, to an arithmetic circuit for calculating and accumulating the absolute values of the difference between two numerical values.

Calculating and accumulating the absolute values of the difference between two numerical values is commonly practiced to, for example, search for an optimum block in the event of coding a video signal using motion compensation. An arithmetic circuit for implementing this kind of operation has customarily been made up of an absolute value calculating section and an accumulating section. The absolute value calculating section or calculator inverts one of two n-bit numerical values represented by 2's compliment notation, adds the inverted numerical value to the other numerical value, and processes the sum on the basis of the sign so as to produce the absolute value of the difference. The accumulating section or accumulator sequentially accumulates the resulting absolute values of the difference. The absolute value calculator may be implemented with an absolute value calculating circuit which is disclosed in European patent application EP 0328063 A2 laid open for public inspection on Aug. 16, 1989. On the other hand, the accumulator may be constituted by the combination of an adder and a delay circuit. Such a conventional arithmetic circuit is advantageous in that the absolute value calculator needs only a single adder. However, the conventional circuit cannot avoid being a large scale circuit which not only slows down the operation due to the delay in data propagation but also aggravates power consumption.

SUMMARY OF THE INVENTION

It is therefore an object of the present invention to provide an arithmetic circuit which is simple in construction and operable at a high speed and has a minimum of power consumption.

In accordance with the present invention, an arithmetic circuit for calculating and accumulating absolute values of a difference between a first and a second numerical value having a predetermined bit length and represented by 2's complement notation and outputting an accumulation result as an operation result comprises a first inverter for inverting the second numerical value to produce an inverted value. A first adder produces a sum of the first numerical value and inverted value and outputs the sum as a first addition result. A second inverter inverts the first addition result to output an inverted addition result. A selector selects either one of the inverted addition result and first addition result on the basis of the sign of the first addition result and outputs the one result as a selected value. A correcting value generating circuit outputs a correcting value on the basis of the sign of the first addition result. A second adder produces a sum of the selected value, the correcting value and a delayed addition result and outputs the sum as a second addition result. A first delay circuit delays the second addition result by a predetermined delay to produce the delayed addition result while outputting the delayed addition result as the operation result.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENTS

To better understand the present invention, a brief reference will be made to a prior art arithmetic circuit, shown in FIG. 1. As shown, the prior art arithmetic circuit has an absolute value calculator 100 and an accumulator 200. The absolute value calculator 100 is constructed and arranged as taught in the previously mentioned European application.

Figure 1:
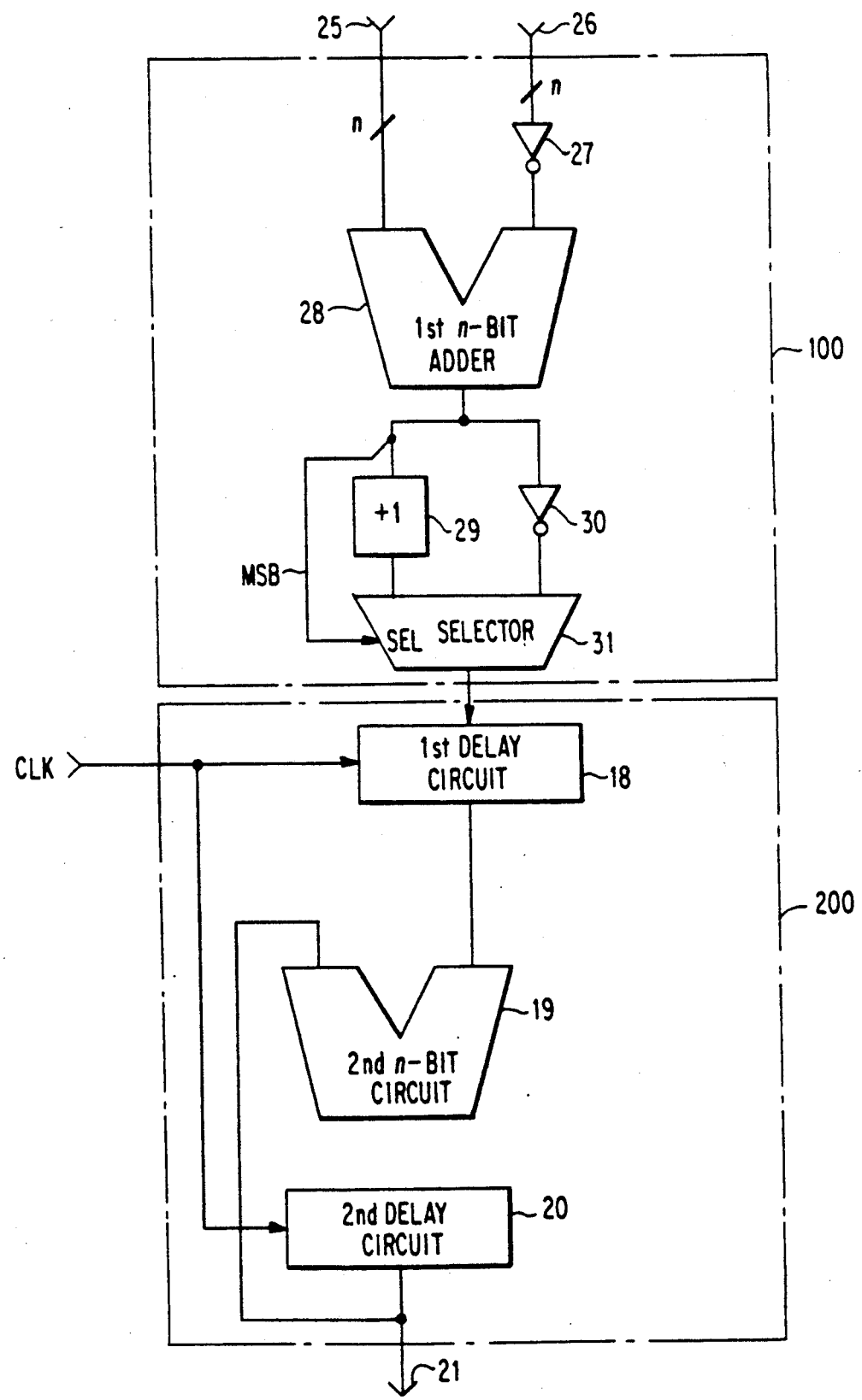
FIG. 1 is a block diagram schematically showing a prior art arithmetic circuit.

In FIG. 1, two numerical values x and y represented by 2's complement notation and having the same predetermined bit length, e.g., n bits, are applied to input terminals 25 and 26. The numerical value x is directly fed to a first n-bit adder 28 while the numerical value y is fed to the adder 28 via a first inverter 27. The numerical value x and the inverted numerical value $\bar{y}$ from the first inverter 27 are added, $x+\bar{y}$, by the first adder 28. By the 2's complement notation, the 2's complement of y is expressed as $\hat{y}=(\bar{y}+1)$. Since $\hat{y}$ is expressed as $(-y)$, $\bar{y}=(-y-1)$ holds. Hence, the output value $(x+\bar{y})$ of the first adder 28 may be represented by $(x+\bar{y})=(x-y-1)$.

The value $(x-y-1)$ is delivered to a second inverter 30 and an increment circuit 29 while the most significant bit (MSB) indicative of the sign of the value is fed to a select terminal of a selector 31. The second inverter 30 inverts $(x-y-1)$ to produce an output $(y-x)$. This is apparent from the fact that $\overline{(x-y-1)}$ produced by inverting $(x-y-1)$ is equal to $\{\overline{(x-y-1)}-1\}$ and $\overline{(x-y-1)}$ is treated equivalently with $-(x-y-1)$, i.e., $\overline{(x-y-1)} = -(x-y-1)-1 = (y-x)$. It is also apparent that the increment circuit 29 produces an output $(x-y)$ since it adds 1 (one) to $(x-y-1)$.

When MSB of $(x-y-1)$ is (logical) ONE, the selector 31 selects the output of the second inverter 30 since $(x-y-1)<0$. Conversely, when MSB is (logical) ZERO, the selector 31 selects the output of the increment circuit 29. A first delay circuit 18 delays the output of the selector 31, i.e., the absolute value $|x-y|$ by one period of a clock signal and feeds the delayed output thereof to a second adder 19 as a delayed absolute value. The second adder 19 adds the delayed absolute value from the first delay circuit 18 to an accumulated value from a second delay circuit 20, the resulting sum being fed to the delay circuit 20. The second delay circuit 20 delays the sum fed thereto from the adder 19 by one clock period and feeds the delayed sum via an output terminal 21 as an operation result while delivering it to the second adder 19. Such a procedure is repeated to accumulate the absolute values of the difference. However, a problem with the circuitry of FIG. 1 is that the operation speed is low and the power consumption is great, as stated earlier.

Figure 2:
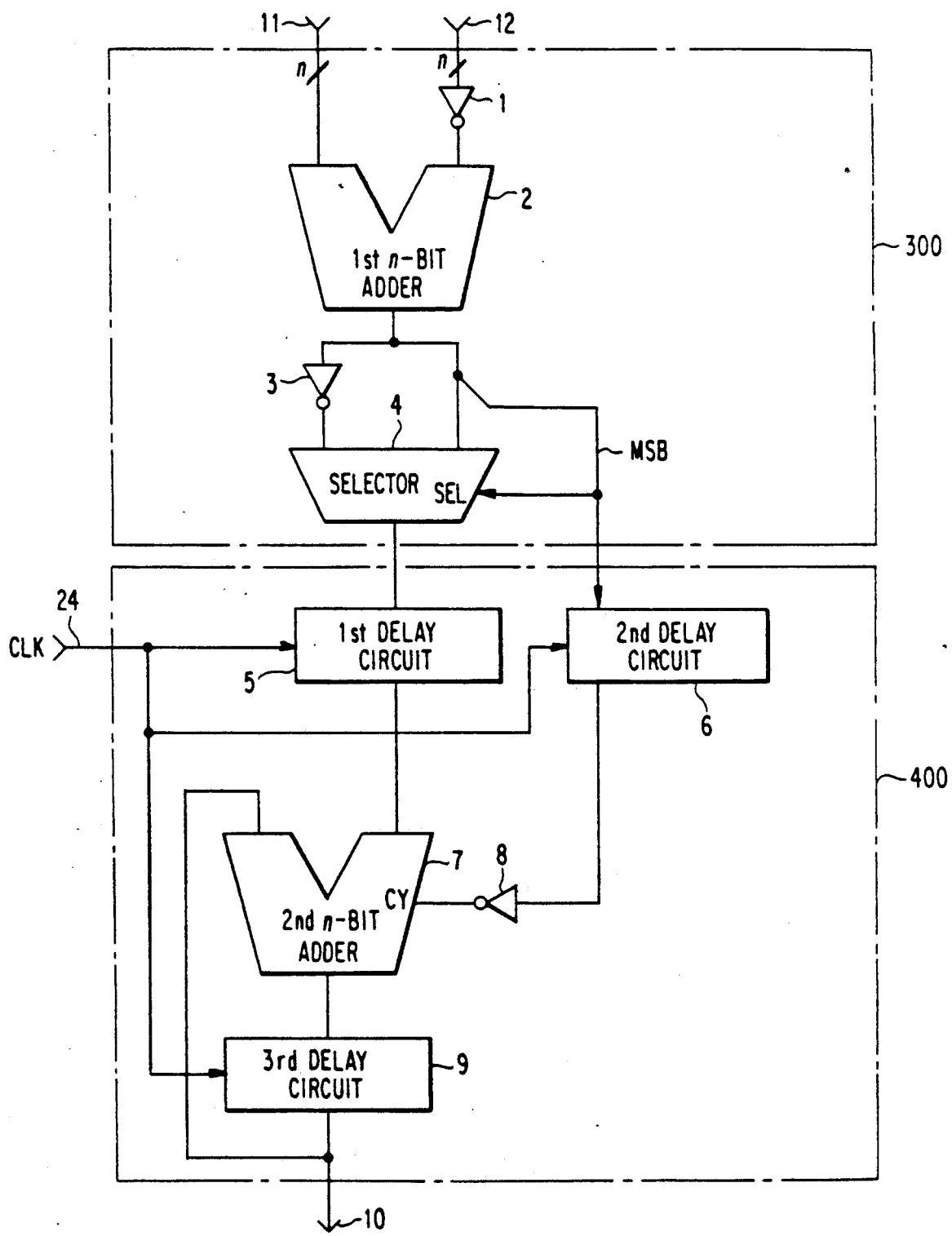
FIG. 2 is a block diagram schematically showing an arithmetic circuit embodying the present invention.

Referring to FIG. 2, an arithmetic circuit embodying the present invention will be described. As shown, the arithmetic circuit has an absolute value calculating section or calculator 300 and an accumulating section or accumulator 400. The absolute value calculator 300 is made up of a first and a second inverter 1 and 3, a first adder 2, and a selector 4. The accumulator 400 is constituted by a first to a third delay circuit 5, 6 and 9, a second adder 7, and a third inverter 8.

The illustrative embodiment operates in the same manner as the prior art circuitry of FIG. 1 as far as the arrival of the n-bit numerical values x and y at a first and a second input terminal 11 and 12 to the generation of the first addition result $(x+\bar{y})=(x-y-1)$ by the first adder 2 is concerned. The first result is fed on one hand directly to the selector 4 and on the other hand to the selector 4 via the second inverter 3. MSB of the first addition result, or sum, is delivered to the select terminal of the selector 4 and the second delay circuit 6. The selector 4 selects either one of the two inputs depending on the value of MSB, i.e., the sign of $(x-y-1)$, as in the prior art circuitry. Specifically, if MSB is ONE, the selector 4 selects the output $\overline{(x-y-1)}=(\bar{y}-x-1)-1=y-x$ of the second inverter 3 since $x-y-1<0$. Conversely, if MSB is ZERO, the selector 4 selects non-inverted $(x-y-1)$ since $x-y \geq 0$. The illustrative embodiment does not include the conventional increment circuit, so that the output of the selector 4 is $(x-y-1)$ when MSB is ZERO. This particular embodiment assigns the role of the increment circuit 29, FIG. 1, to the second adder 7. The absolute value outputted by the selector 4 is delayed by the first delay circuit 5 by one period of a clock signal which is applied to a clock input terminal 24. The delayed absolute value is fed to the second adder 7. Likewise, MSB of the output $(x-y-1)$ of the first adder 2 is delayed by the second delay circuit 6 by one clock and then fed out as delayed MSB. The third inverter 8 inverts the delayed MSB and feeds the inverted delayed MSB to the carry input terminal CY of the second adder 7. The second adder 7 adds the delayed absolute value from the first delay circuit 5, the immediately preceding accumulation result fed from the third delay circuit 9, and the value applied to the carry input terminal CY. Since the value on the carry input terminal is the inverted MSB of $(x-y-1)$, as previously stated, it is ONE when $x-y-1 \geq 0$, i.e., when MSB is ZERO. On the other hand, the selector 4 outputs $(x-y-1)$ when MSB is ZERO, as also stated earlier. Hence, at the time of addition at the second adder 7, the delayed absolute value $(x-y-1)$ is $x-y$ when MSB is ZERO and, therefore, summation, the same as the addition by the second adder 19, FIG. 1, is achieved. The delay circuit 9 has the same construction and function as the second delay circuit 20, FIG. 1. Specifically, the delay circuit 9 delays the second addition result from the second adder 7 by one period of the clock signal and feeds the delayed sum to the second adder 7 as an immediately preceding result of accumulation while feeding it out as an operation result via an output terminal 10. The result of operation is outputted via the third delay circuit 9 and not directly from the second adder 7, as shown and described. This is to synchronize the operation result to the clock signal. With the construction described above, the illustrative embodiment implements the same function as the prior art circuitry of FIG. 1.

Figure 3:
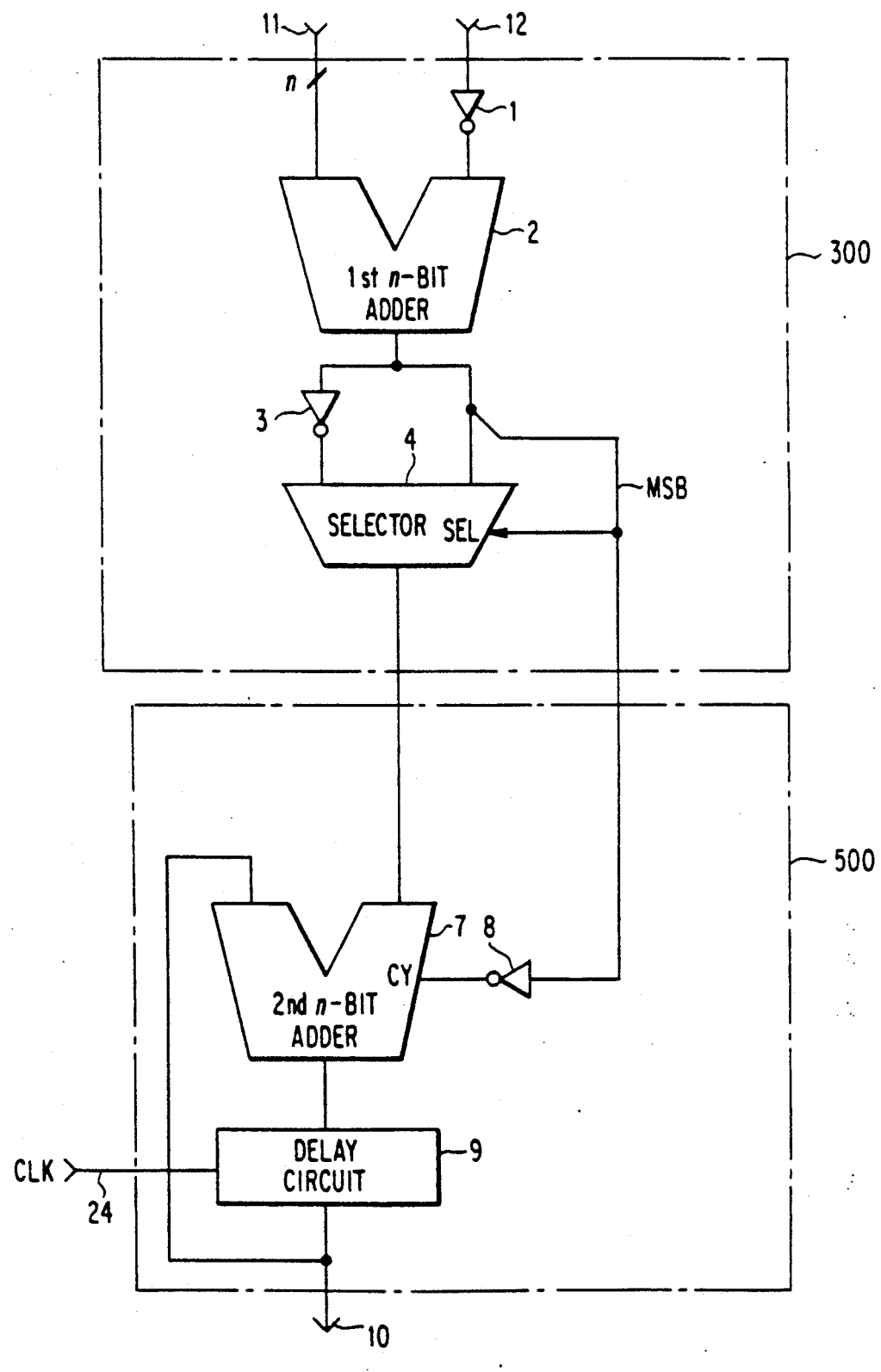
FIG. 3 is a schematic block diagram showing an alternative embodiment of the present invention.

FIG. 3 shows an alternative embodiment of the present invention which is essentially the same in construction and operation as the previous embodiment except for an accumulator 500. Specifically, the accumulator 500 shown in FIG. 3 does not have the first and the second delay circuits of FIG. 2. The first and second delay circuits 5 and 6 of the previous embodiment serve to match the speeds of the outputs of the selector 4 and third delay circuit 9 by considering the low operation speed of the second adder 7. Such speed matching delay circuits are omittable if the second adder 7 is implemented with a bipolar element or similar element operable at high speed.

In summary, it will be seen that the present invention provides an arithmetic circuit which eliminates the need for the conventional increment circuit by inverting MSB of the output of a first adder and feeding the inverted MSB to the carry input of a second adder. As a result, the serial connection of the first adder and increment circuit is omitted to enhance high speed arithmetic operations, miniaturizing circuit arrangement, and cut-down on power consumption.

Various modifications will become possible for those skilled in the art after receiving the teachings of the present disclosure without departing from the scope thereof.

What is claimed is:

1. An arithmetic circuit for calculating and accumulating absolute values of a difference between a first and a second numerical value having a predetermined bit length and represented by 2's complement notation and outputting an accumulation result as an operation result, said circuit comprising:

first inverting means for inverting the second numerical value to produce an inverted value;

first adder means for producing a sum of the first numerical value and said inverted value and outputting said sum as a first addition result;

second inverting means for inverting the first addition result to output an inverted addition result;

selecting means for selecting either one of said inverted addition result and said first addition result on the basis of a sign of said first addition result and outputting said one result as a selected value;

correcting value generating means for outputting a correcting value on the basis of a sign of said first addition result;

second adder means for producing a sum of said selected value, said correcting value and a delayed addition result and outputting said sum as a second addition result; and first delaying means for delaying said second addition result by a predetermined delay to produce said delayed addition result while outputting said delayed addition result as the operation result.

2. An arithmetic circuit as claimed in claim 1, wherein said selecting means selects said inverted addition result when said first addition result is negative or said first addition result when said first addition result is positive.

3. An arithmetic circuit as claimed in claim 1, wherein said selecting means comprises a selector which receives a sign bit of said first addition result as a selection input.

4. An arithmetic circuit as claimed in claim 1, wherein said correcting value generating means comprises inverter means for inverting a sign bit of said first addition result.

5. An arithmetic circuit as claimed in claim 1, further comprising second delaying means for delaying said selected value and said correcting value by said predetermined delay and feeding said delayed selected value to said second adder means.

* * * * *

UNITED STATES PATENT AND TRADEMARK OFFICE
CERTIFICATE OF CORRECTION

PATENT NO. : 5,040,136
DATED : August 13, 1991
INVENTOR(S) : Toshiyuki Kanoh It is certified that error appears in the above-identified patent and that said Letters Patent is hereby corrected as shown below:

On the title page item [30]:

In Priority Data delete "64", insert -- 1 --

Signed and Sealed this

Twenty-second Day of December, 1992

Attest:

DOUGLAS B. COMER

*Attesting Officer*  *Acting Commissioner of Patents and Trademarks*